(12) United States Patent
Catton

(10) Patent No.: US 7,568,675 B2
(45) Date of Patent: Aug. 4, 2009

(54) SCISSOR SUSPENSION

(75) Inventor: Jonathan C. Catton, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/473,725

(22) Filed: Jun. 23, 2006

(65) Prior Publication Data

US 2007/0295882 A1  Dec. 27, 2007

(51) Int. Cl.
  *F16M 1/00* (2006.01)
  *B60N 2/02* (2006.01)
(52) U.S. Cl. ............... 248/588; 248/421; 296/65.02; 297/344.16
(58) Field of Classification Search ............ 248/588, 248/584, 591, 421, 429, 550, 631; 267/64.9, 267/64.19; 297/344.16, 338; 296/65.02
See application file for complete search history.

(56) References Cited

U.S. PATENT DOCUMENTS

| 2,791,263 | A | * | 5/1957 | Chayne ............... 248/419 |
| 3,826,457 | A | | 7/1974 | de Longchamp |
| 4,125,242 | A | | 11/1978 | Meiller et al. |
| 4,272,117 | A | * | 6/1981 | Vilbeuf ............... 296/65.02 |
| 4,729,539 | A | | 3/1988 | Nagata |
| 5,014,960 | A | * | 5/1991 | Kimura ............... 248/602 |
| 5,125,631 | A | * | 6/1992 | Brodersen et al. ........ 267/131 |
| 5,222,709 | A | | 6/1993 | Culley, Jr. et al. |
| 5,251,864 | A | | 10/1993 | Itou |
| 5,799,922 | A | * | 9/1998 | Timms et al. ........... 248/564 |
| 5,871,198 | A | * | 2/1999 | Bostrom et al. ......... 248/588 |
| 5,927,679 | A | * | 7/1999 | Hill ................... 248/588 |
| 5,950,977 | A | | 9/1999 | Proksch et al. |
| 6,550,740 | B1 | * | 4/2003 | Burer ................. 248/564 |
| 6,691,970 | B1 | * | 2/2004 | Sutton, Sr. ............ 248/425 |

FOREIGN PATENT DOCUMENTS

| EP | 0177230 | 4/1986 |
| GB | 1278921 | 6/1972 |

OTHER PUBLICATIONS

John Deere—Parts Catalog: Standard Seat Suspension and Service Kits, 350D and 400D Articulated Dump Truck, [online], (retrieved on Sep. 25, 2008) Retrieved from the catalog database of the John Deere web site using the internet <URL:http://www.deere.com/>.
Sittab Stol AB, http://www.sittab.se/products.php?group-3&id-9 &lang-eng, accessed on Mar. 10, 2006, one (1) page.

* cited by examiner

*Primary Examiner*—Anita M King
(74) *Attorney, Agent, or Firm*—Richard K. C. Chang, II

(57) ABSTRACT

A scissor suspension includes a first arm having a first end and a second end. The first end may be configured for pivotal attachment to a structure and a first bearing may be pivotally connected proximate to the second end of the first arm. A second arm having a first end and a second end may be pivotally connected to the first arm between the first and second ends of the first and second arms. The first bearing may be moveably coupled to the first rail.

13 Claims, 4 Drawing Sheets

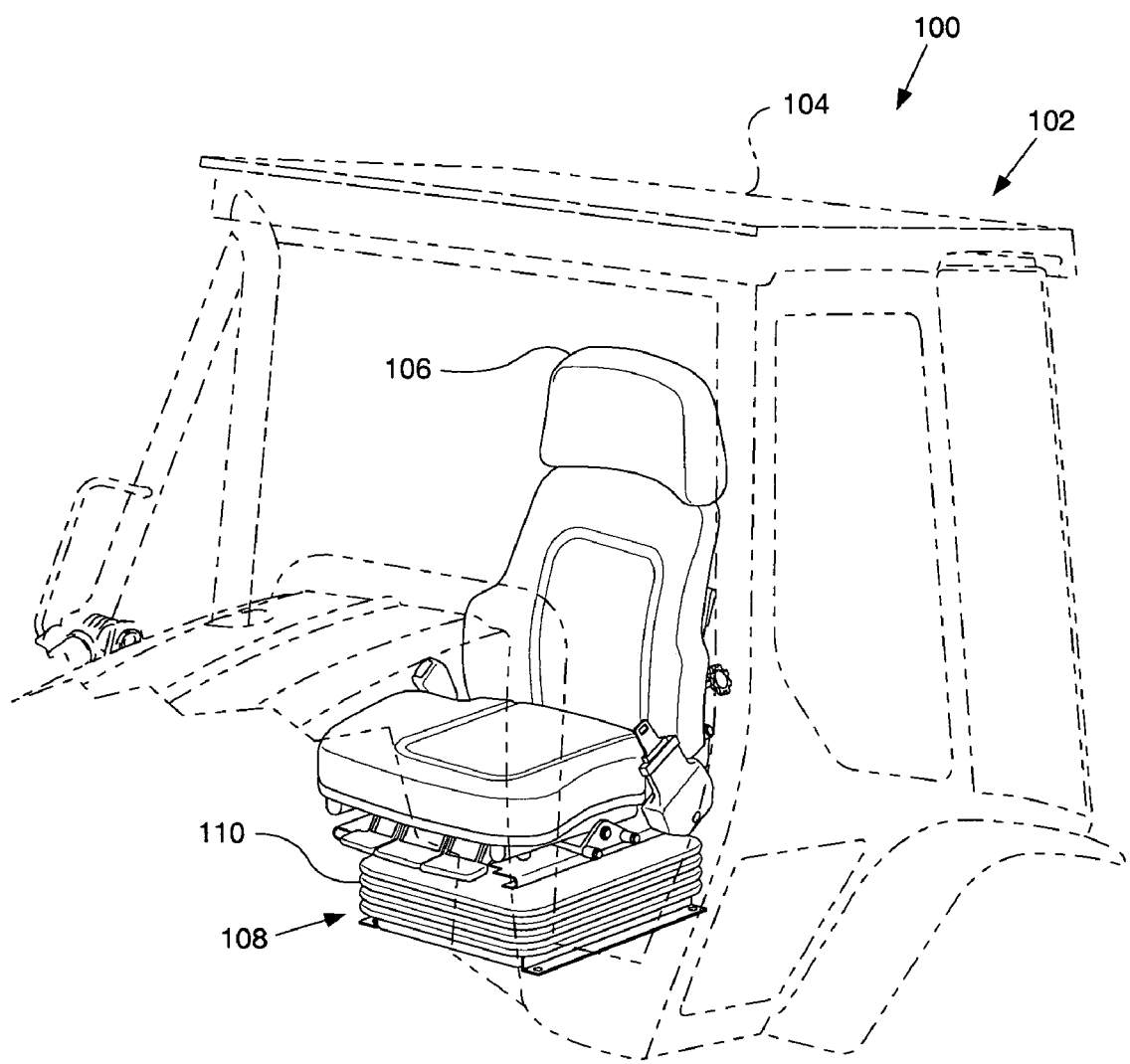
Fig_1_

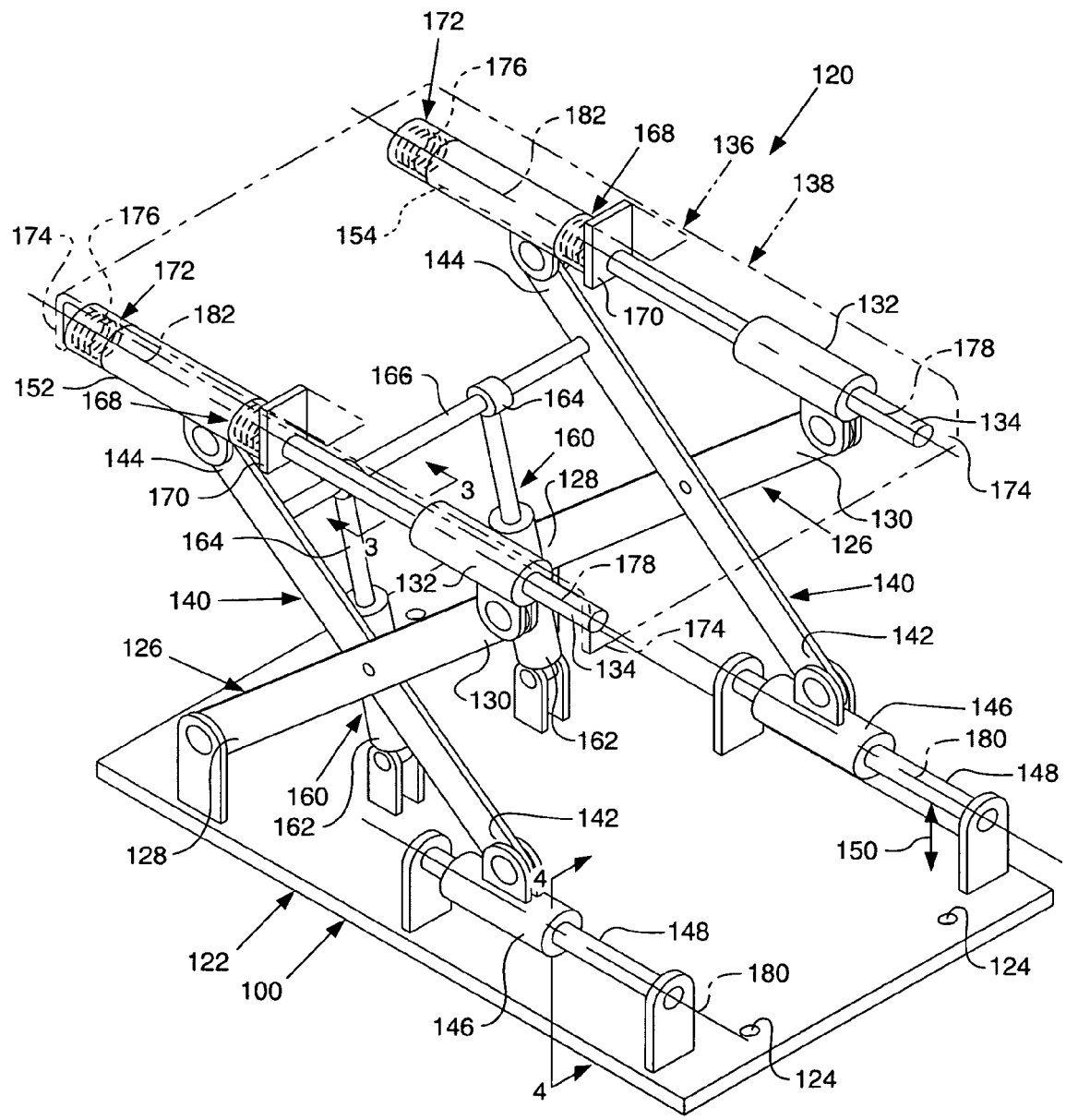

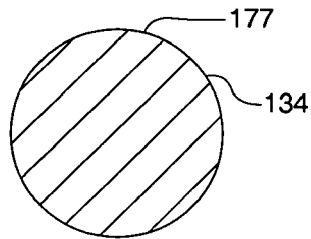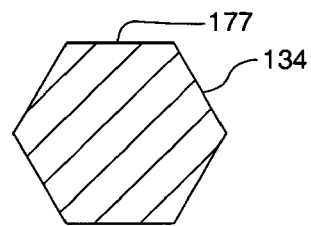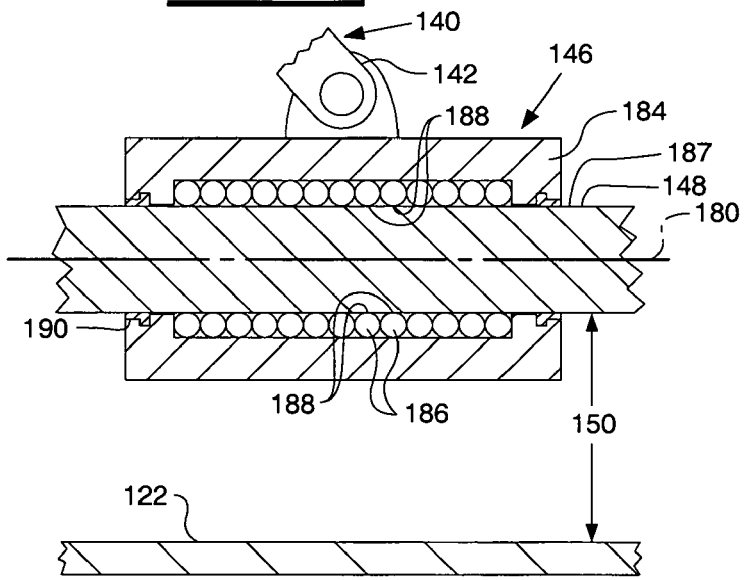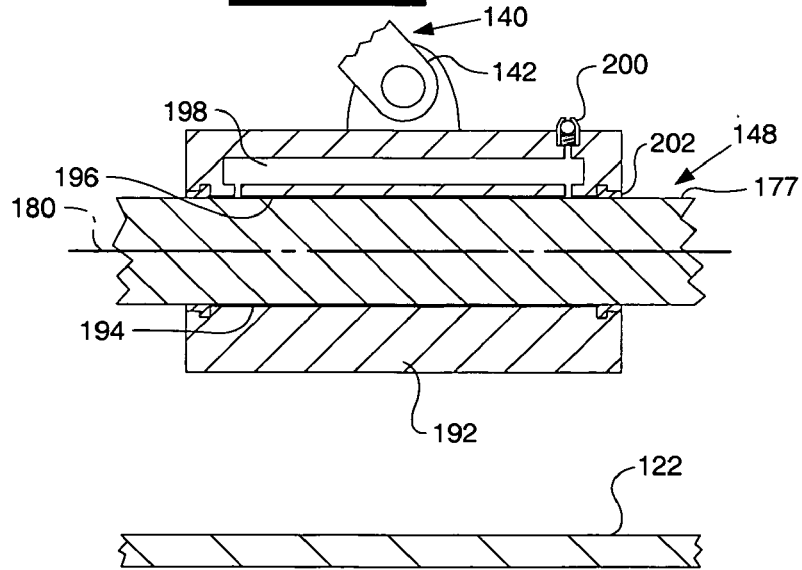

SCISSOR SUSPENSION

TECHNICAL FIELD

This invention relates generally to a scissor suspension for reducing vibrations transmitted through the scissor suspension.

BACKGROUND

Machines, such as skid steer loaders, multi-terrain loaders, backhoe loaders, agricultural tractors, track-type tractors, articulated trucks, wheel loaders, off-road vehicles, dump trucks, and other types of construction, mining, and agricultural machinery are used for a variety of tasks requiring operator control. Typically, an operator controls these machines while seated in a seat located on the machine for extended periods of time. However, these machines often vibrate during operation, which may cause the operator may fatigue quickly reducing the effectiveness of the operator and the time the operator is able to actively operate the machine.

Consequently, suspensions have been developed to reduce the vibrations passed from the operating machine to the seat of the operator. For example, U.S. Pat. No. 5,251,864 illustrates a scissor suspension that uses rollers to provide low frictional movement of the suspension in response to the vibration of a machine. Roller-type scissor suspensions also permit dampers to be installed to provide fore-aft dampening.

However, a roller may only have one point of contact while moving in a track. Consequently, roller-type scissor suspensions are loosely assembled. A loosely assembled suspension permits specific parts to receive jarring impacts during machine operation. Thus, roller-type scissor suspensions suffer from excessive wear and premature failure.

The inherent looseness of roller-type scissor suspensions may prevent the scissor suspension from adequately reducing the vibrations transmitted from the machine to the seat. Additionally, roller-type scissor suspensions are susceptible to dirt and debris building up in the tracks that inhibit proper movement of the rollers and promote wear and premature failure of the roller-type scissor suspension.

Other scissor suspensions include linkage-type suspensions that permit a strong close-fitting scissor suspension without the looseness associated with roller-type scissor suspensions. Additionally, because of the typically close-fitting assembly of linkage-type scissor suspensions, linkage-type scissor suspensions have better wear patterns and longer service life than roller-type scissor suspensions.

However, linkage-type scissor suspensions may suffer from excessive friction and stiffness, which may prevent linkage-type scissor suspensions from properly moving to dampen the vibrations and shocks of machine use and travel. Additionally, linkage-type scissor suspensions do not support integrated fore-aft or lateral motion dampening.

Typically, these roller-type and linkage-type scissor suspensions are used to help isolate a seat of a machine from the vibrations of the machine, which provides a more comfortable working environment to machine operators. In recent years, more and more equipment has been connected and attached to the seat, significantly increasing the weight that a scissor suspension is required to support. However, these roller-type and linkage-type scissor suspensions may not be robust enough to support this additional weight and effectively dampen the vibrations of the machine. Additionally, when these roller-type and linkage-type scissor suspensions are used, they suffer from accelerated wear and premature failure resulting from this increased weight.

The present invention is directed to overcome one or more of the problems as set forth above.

SUMMARY OF THE INVENTION

In one example, a scissor suspension may include a first arm having a first end configured for pivotal attachment to a structure and a second end. A first bearing may be pivotally connected proximate to the second end of the first arm and may be moveably coupled to a first rail. A second arm having a first end and a second end may be pivotally connected to the first arm between the first and second ends of the first and second arms.

In another example, a scissor suspension may include a scissor assembly moveably connecting a first frame with a second frame with a first damper disposed to dampen movement of the second frame relative to the first frame. The scissor assembly may include a first arm having a first end pivotally attached to the first frame and a second end. A first bearing may be pivotally connected proximate to the second end of the first arm and moveably coupled to a first rail attached to the second frame. A second damper disposed to dampen movement of the second frame relative to the first bearing. The scissor assembly may also include a second arm having a first end and a second end that may be pivotally connected to the first arm between the first and second ends of the first and second arms.

A method is also provided for using an example of a scissor suspension. The scissor suspension may include a first arm having a first end pivotally attached to a structure and a second end. The scissor suspension may also include a first bearing pivotally connected proximate to the second end of the first arm and a second arm having a first end and a second end that may be pivotally connected to the first arm between the first and second ends of the first and second arms. The first bearing may be moveably coupled to the first rail and the scissor suspension may also include a damper disposed to dampen movement of the first rail relative to the structure.

The method may include the step of moving the first bearing along the first rail in response to an input motion of the structure. The method may also include the step of dampening movement of the first rail relative to the structure.

BRIEF DESCRIPTION OF THE DRAWINGS

FIG. 1 is a perspective view of an operator compartment of a machine.

FIG. 2 is a perspective view of a scissor suspension for use in the operator compartment of FIG. 1.

FIG. 3a is a cross sectional view along line 3-3 of FIG. 2 of the rail of the scissor suspension.

FIG. 3b is a cross sectional view along line 3-3 of FIG. 2 of an alternative configuration of the rail of the scissor suspension.

FIG. 4a is a cross sectional view along line 4-4 of FIG. 2 of a bearing of the scissor suspension.

FIG. 4b is a cross sectional view along line 4-4 of FIG. 2 of another configuration of the bearing of the scissor suspension.

DETAILED DESCRIPTION

Figure 5:
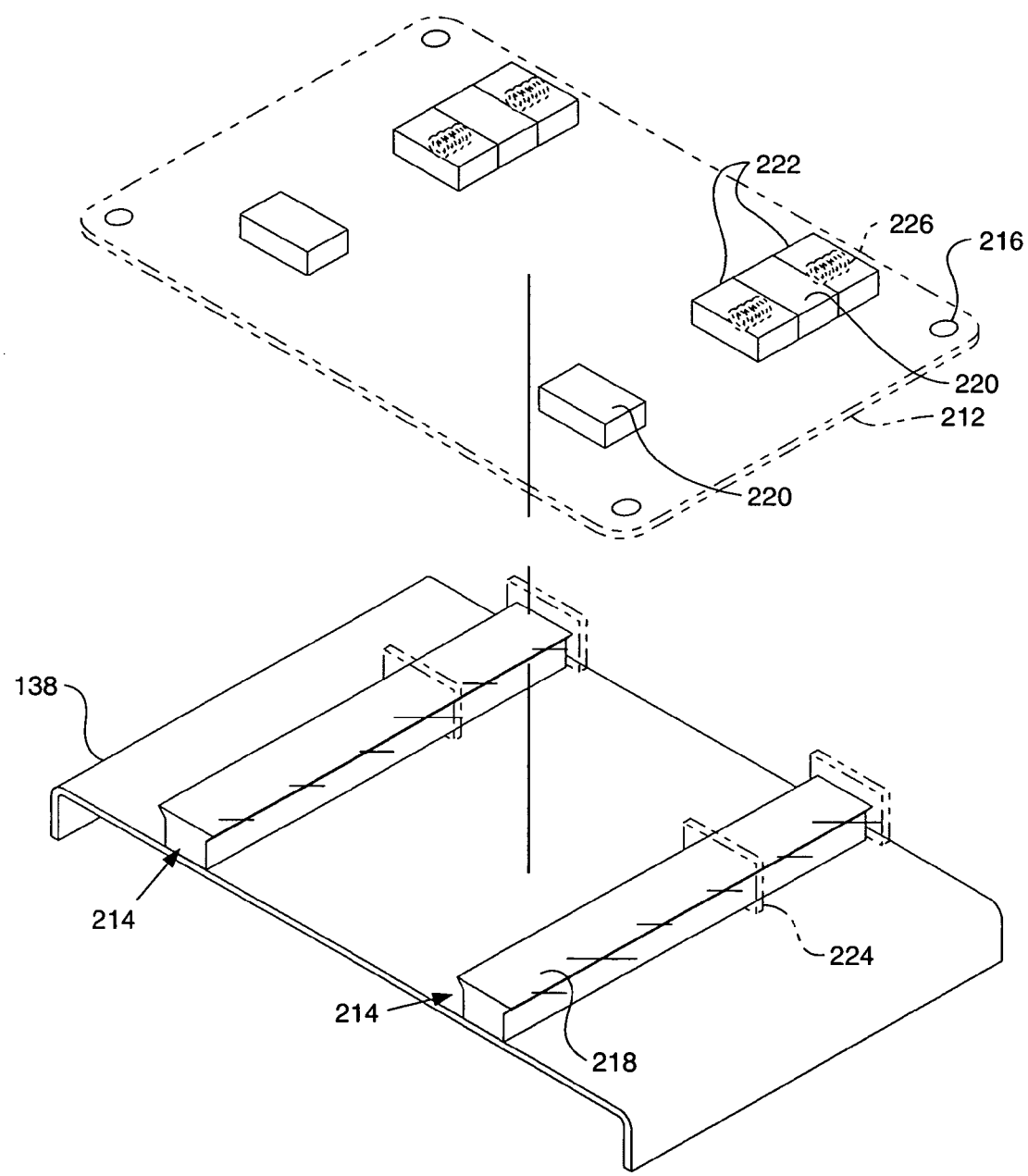
FIG. 5 is a perspective view of an alternative second frame of the scissor suspension.

Referring to FIG. 1, a perspective view illustrates a structure 100, which may be a machine 102 that includes an operator compartment 104. The machine 102 may be a backhoe loader, agricultural tractor, track-type tractor, articulated truck, wheel loader, and other types of construction, mining, or agricultural machinery.

As shown, the operator compartment 104 may include a seat 106 mounted on a suspension system 108. The suspension system 108 is attached to the structure 100 and dampens the vibrations associated with the operation of the machine 102 in order to increase operator comfort while seated in the seat 106.

The suspension system 108 may include a shroud 110 that conforms to the movement of the suspension system 108. The shroud 110 helps prevents contaminates such as water, dirt, rocks and other objects from affecting the performance of the suspension system 108. The shroud 110 may be made of cloth, an elastomer or other plastic, and any other material known in the art, that moves with the actuation of the suspension system 108.

Referring to FIG. 2, a perspective view of a scissor suspension 120 for use in the suspension system 108 shown in FIG. 1. The scissor suspension 120 may include a first frame 122 that facilitates the attachment of the scissor suspension 120 to the machine 102. For example, the first frame 122 may include mounting holes 124 that permit the first frame 122 to be bolted to the machine 102. Alternatively, the first frame 122 may be attached to the machine 102 by welding, clamps, adhesives, mechanical fasteners, or any other means known in the art.

As shown, the scissor suspension 120 may include a plurality of first arms 126. Of course, the scissor suspension 120 may include a single first arm 126. Because the first arms 126 are similar to each other and are connected together so that they operate as one, only one of the first arms 126 will be described hereafter in detail.

The first arm 126 has a first end 128 and a second end 130. The first end 128 of the first arm 126 may be configured for pivotal attachment to a structure 100. For example, the first end 128 may be pivotally attached to the first frame 122.

The scissor suspension 120 may also include a first bearing 132 pivotally connected proximate to the second end 130 of the first arm 126. The first bearing 132 may be a linear bearing, a sleeve bearing, roller bearing, or any other type of low friction bearing known in the art.

The first bearing 132 may be moveably coupled to a first rail 134. The first rail 134 may be attached to another structure 136, such as the seat 106 of FIG. 1 or a second frame 138 as shown.

A second arm 140 having a first end 142 and a second end 144 is pivotally connected to the first arm 126 between the first and second ends 128, 130, 142, 144, of the first and second arms 126, 140. Additionally, the first and second arms 126, 140 may be straight or curved.

A second bearing 146 may be pivotally connected proximate to the first end 142 of the second arm 140 and moveably coupled to a second rail 148. The second bearing 146 may be a linear bearing, a sleeve bearing, roller bearing, or any other type of low friction bearing known in the art.

The second rail 148 may be attached to the first frame 122 so that a gap 150 may be disposed between the second rail 148 and the first frame 122. The gap 150 permits dirt and debris to fall away from the second rail 148 as the second bearing 146 moves back and forth over the second rail 148. Consequently, the second bearing 146 may be less likely to suffer from failure related to dirt and debris.

The scissor suspension 120 may include a third bearing 152 pivotally connected proximate to the second end 144 of the second arm 140. The third bearing 152 may be moveably coupled to a third rail 154. The third bearing 152 may be a linear bearing, a sleeve bearing, roller bearing, or any other type of low friction bearing known in the art. Of course, the third bearing 152 is optional and may be replaced by a pivot or a roller in some configurations.

The scissor suspension 120 may also include a damper 160 disposed to dampen motion of the first rail 134 relative to the second rail 148. For example, the damper 160 may have a first end 162 pivotally attached to the first frame 122 and a second end 164 pivotally connected to the second arm 140 through a connection member 166. Alternatively, the damper 160 may have a first end 162 attached to the second bearing 146 and the second end 164 attached to the first frame 122 to dampen movement of the second bearing 146 along the second rail 148 and thus, dampen motion of the first rail 134 relative to the second rail 148 or in other words, dampen movement of the second frame 138 relative to the first frame 122.

Additionally, scissor suspension 120 may include a second damper 168 disposed to dampen movement of the second frame 138 relative to the first bearing 132. For example, the second damper 168 may be disposed between the third bearing 152 and a positioning tab 170 the second frame 138 to dampen movement of the second frame 138 relative to the first bearing 132. The positioning tabs 170 of the second frame 138 may be used to limit the range of motion of the first and third bearings 132, 152.

A third damper 172 may also be disposed between the third bearing 152 and an end tab 174 the second frame 138 to dampen movement of the second frame 138 relative to the first bearing 132. Consequently, the first and second dampers 160, 172 are able to provide fore and aft motion isolation from the structure 100 while the first damper 160 provides vertical motion isolation from the structure 100. Of course, the first and second dampers 160, 172 may be disposed in other ways known in the art to dampen the motion of other components of the scissor suspension 120 relative to the structure 100.

The scissor suspension 120 may also include springs 176 or other actuators known in the art that return the second frame 138 to a desired position relative to the second and third bearings 146, 152.

The positioning tabs 170 may be used to attach the first and third rail 134, 154 to the second frame 138. In some configurations, the first rail 134 and the third rail 154 are integrally formed as a single rail that extends through the positioning tabs 170 and is attached to the end tabs 174 of the second frame 138.

Referring to FIG. 3a, a cross sectional view along line 3-3 of FIG. 2 illustrates a configuration of the first rail 134 of the scissor suspension 120. As shown, the first rail 134 may have a circular exterior profile 177 and a solid cross sectional area. Alternatively, the first rail 134 may have a hollow cross sectional area.

FIG. 3b illustrates another configuration of the first rail 134 of the scissor suspension 120. As shown, the first rail 134 may have an exterior profile having a noncircular shape that extends along the longitudinal axis 178 of the first rail 134. The noncircular shape prevents rotation of the first bearing 132 about the longitudinal axis 178 of the first rail 134. For example, the first rail 134 may have a polygonal exterior profile or may be keyed to limit the potential motion of the first bearing 132 to linear motion along the longitudinal axis 178 of the first rail 134.

Additionally, the second and third rails 148, 154 may have the same exterior profile as the first rail 134. Consequently, the second and third rails 148, 154 may have circular or noncircular cross sectional profiles extending along its longitudinal axis 180, 182.

Referring to FIG. 4a, a cross sectional view along line 4-4 of FIG. 2 illustrates a configuration of the second bearing 146 coupled to the second rail 148. The second rail 148 may be positioned above the first frame 122 so that the gap 150 is disposed between the second rail 148 and the first frame 122.

The second bearing 146 may be a linear bearing, a roller bearing, or another bearing that includes a housing 184 configured for pivotally coupling to the second arm 140. The second bearing 146 may include a plurality of ball bearings or rollers 186 that roll over a raceway 187 of second rail 148. The plurality of ball bearings or rollers 186 provide a plurality of points of contact 188 between the plurality of ball bearings or rollers 186 and the second rail 148. The plurality of points of contact 188 may be configured to provide contact on opposite sides of the second rail 148 and may be separately disposed radially about or longitudinally along the second rail 148. The plurality of points of contact 188 provides a sturdier scissor suspension assembly than is possible with roller-type scissor suspensions without the friction of linkage-type suspensions.

Additionally, the second bearing 146 may include a wiper 190 that may move debris off the second rail 148 and prevent debris from being disposed between the second bearing 146 and the second rail 148 as the second bearing 146 moves over the second rail 148. In other words, the wiper 190 wipes debris from the raceway 187 of the second rail 148 so that the debris fall through the gap 150 to the first frame 122 as the second bearing 146 moves along the second rail 148.

Referring to FIG. 4b, a cross sectional view along line 4-4 of FIG. 2 illustrates another configuration of the second bearing 146 coupled to the second rail 148. As shown, this configuration of the second bearing 146 may be a sleeve bearing that may include a housing 192 having a bearing surface 194 that closely follows the exterior profile 177 of the second rail 148.

A thin layer of lubricant 196 may be disposed between the bearing surface 194 and the second rail 148 so that the second bearing 146 does not contact the second rail 148 as the second bearing 146 slides on the lubricant 196 along the second rail 148 in response to the input motion of the structure 100. The housing 192 may also include a lubricant reservoir 198 for maintaining the thin layer of lubricant 196 between the housing 192 and the second rail 148. The second bearing 146 may also include a valve 200 for replenishing the lubricant reservoir 198 over time and wipers 202 for maintaining the thin layer of lubricant 196 between the housing 192 and the second rail 148.

Of course, the first and third bearings 132, 152 may be similarly configured as the second bearing 146 as shown in FIGS. 4a and 4b and may be a sleeve bearing, a linear bearing, or a roller bearing.

Referring to FIG. 5, an exploded view illustrates an alternative second frame 138 that may be used in place of the second frame 138, shown in FIG. 2, with the scissor suspension 120. As shown, a third frame 212 may be moveably coupled to the second frame 138 by a coupling 214. The third frame 212 may include mounting holes 216 or other attachment structures known in the art for attaching the third frame 212 to the seat 106 shown in FIG. 1.

The coupling 214 may provide lateral isolation to the third frame 212 from the movements of the structure 100, the first and second frames 122, 138. The coupling 214 may include a rail 218 attached to the second frame 138 and a bearing 220 moveably coupled to the rail 218. The bearing 220 may be attached to the third frame 212. Of course, the rail 218 may be attached to the third frame 212 and the bearing 220 may be attached to the second frame 138

As shown, the bearing 220 may be a slide way. Of course, the first, second, and third bearings 132, 146, 152 discussed above may be configured similarly as bearing 220.

The coupling 214 may include a damper 222 disposed to dampen movement of the third frame 212 relative to the second frame 138. For example, the damper 222 may be disposed to engage the bearing 220 and a stop 224 attached to the rail 218. Alternatively, the stop 224 may be attached to the second frame 138. The damper 222 may be disposed to dampen movement between the third frame 212 and the second frame 138.

The stop 224 may be used to limit the displacement of the bearing 220 on the rail 218. The damper 222 may include a spring 226 that may be used to return the bearing 220 to a desired position between the stops 224. Of course, some of the bearings 220 may not be limited by stops 224 and may not be disposed to engage a damper 222.

In conclusion, a scissor suspension system is provided that provides, vertical, fore-aft, and lateral isolation from the vibrations and motion of the structure 100 or machine 102. The fore-aft isolation may be provided integrally with the scissor suspension as shown in FIG. 1 with the addition of a minimal amount of parts. The scissor suspension may also provide a sturdier assembly than roller-type scissor suspensions. The scissor suspension may also be able to operate with less friction than linkage-type scissor suspensions. This performance may be achieved through the use of bearings in place of one or more rollers or linkage arms of prior art suspension systems.

The scissor suspension may include parts made of metal, plastic, ceramic, or a composite material. For example, the bearings may be made of brass, powdered metal, steel, iron, titanium, PTFE, and other materials known in the art.

INDUSTRIAL APPLICABILITY

The scissor suspension 120 may be used to dampen the motion and vibration transmitted from the structure 100 to the seat 106 of FIG. 2. More specifically, the scissor suspension 120 may be disposed between the seat 106 of the operator compartment 104 and the machine 102 to provide a more comfortable operator environment.

The scissor suspension 120 may be operated by moving the first bearing along the first rail in response to an input motion of the structure 100 and dampening the movement of the first rail 134 relative to the first frame 122. Dampening the movement of the first rail 134 relative to the first frame 122 may be accomplished by dampening the vertical motion of the first frame 122 relative to the first bearing 132. The scissor suspension 120 may also be operated by moving the second bearing 146 along the second rail 148 in response to the input motion of the structure 100 or pivoting the first arm 126 relative to the first frame 122.

Additionally, in some configurations, the first and second bearings 132, 146 may operate to wipe the raceway 187 of the first and second rails 134, 148 as the first and second bearings 132, 146 respectively move along the first and second rails 134, 148.

In configurations of the scissor suspension 120 that include a second or third damper 168, 172, the scissor suspension 120 may be operated by damping the motion of the second bearing 146 along the second rail 148 relative to the second frame 138 to provide fore-aft isolation of the seat 106 from the structure 100. Additionally, in configurations where a third frame 212 is moveably coupled to the second frame 138, the scissor suspension 120 operates to provide lateral dampening of a laterally oriented input motion by moving the bearing 220 along the rail 218 and dampening the movement of the third frame 212 relative to the second frame 138.

Where the first and second rails 134, 148 have noncircular exterior profiles, the suspension system may operate to prevent the rotation of the first and second bearings 132, 146 respectively about the longitudinal axis 178, 180 of the first and second rails 134, 148.

It will be apparent to those skilled in the art that various modifications and variations can be made without departing from the scope or spirit of the invention. For example, the third bearing 152 may be pivotally attached to the second frame 138 to provide only isolation of vertical input motion. Additionally, other embodiments of the invention will be apparent to those skilled in the art from consideration of the specification and practice of the invention disclosed herein. It is intended that the specification and examples be considered as exemplary only.

What is claimed is:

1. A scissor suspension comprising:
   a first frame;
   a second frame;
   a scissor assembly moveably connecting the first frame with the second frame, wherein the scissor assembly comprises;
   a first arm including a first end and a second end, wherein the first arm is pivotally attached to the first frame proximate to the first end;
   a first bearing pivotally connected proximate to the second end of the first arm;
   a second arm including a first end and a second end, wherein the second arm is pivotally connected to the first arm between the first and, second ends of the first and second arms;
   a first rail attached to the second frame, wherein the first bearing is moveably coupled to the first rail;
   a first damper disposed to dampen movement of the second frame relative to the first frame; and
   a second damper disposed to dampen movement of the second frame relative to the first bearing.

2. The scissor suspension of claim 1, wherein the first bearing is a sleeve bearing.

3. The scissor suspension of claim 1, further comprising third frame moveably coupled to the second frame, wherein the coupling between the third frame and the second frame include a rail, a bearing moveably coupled to the rail, and a third damper disposed to dampen movement between the third frame and the second frame.

4. The scissor suspension of claim 1, wherein the first rail is shaped to prevent rotation of the first bearing about a longitudinal axis of the first rail.

5. The scissor suspension of claim 1, wherein the scissor assembly further comprises a second bearing pivotally connected to the second arm proximate to the first end, wherein the second bearing is moveably coupled to a second rail, wherein the second rail is attached to the first frame such that a gap is disposed between the second rail and the first frame.

6. The scissor suspension of claim 1, wherein the first bearing includes a plurality of ball bearings or a bearing surface, wherein the bearing surface closely follows an exterior profile of the first rail.

7. The scissor suspension of claim 1, wherein The first rail is shaped to prevent rotation of the first bearing about a longitudinal axis of the first rail.

8. A method for using a scissor suspension, the scissor suspension comprising a first arm including a first end and a second end, wherein the first arm is pivotally attached to a structure proximate the first end, wherein the scissor suspension further comprises a first bearing pivotally connected proximate to the second end of the first arm and a second arm having a first end and a second end, the second arm being pivotally connected to the first arm between the first and second ends of the first and second arms, wherein the scissor suspension further includes a first rail and a damper disposed to dampen movement of the first rail relative to the structure, wherein the first bearing is moveably coupled to the first rail, the method comprising:
   moving the first bearing along the first rail in response to an input motion of the structure;
   wiping a raceway of the-first rail as the first bearing moves along the first rail; and dampening movement of the first rail relative to the structure.

9. The method of claim 8, wherein the scissor suspension further comprises a frame attached to the first rail and a second damper disposed to dampen motion of the frame relative to the first bearing, the method further comprising the step of dampening motion of the frame relative to the first bearing.

10. The method of claim 8, wherein the scissor suspension further comprises a second bearing pivotally attached to the second arm proximate to the first end of the second arm, wherein the second bearing is moveably coupled to a second rail attached to the structure, the method further comprising the step of moving the second bearing along the second rail in response to the input motion of the structure, wherein the first and second bearings each maintain a plurality of points of contact with the first and second rails respectively, wherein the plurality of points of contact are separately disposed radially about the respective first and second rails.

11. The method of claim 10, further comprising the step of wiping a raceway of the second rail as the second bearing moves along the second rail.

12. The method of claim 8, further comprising the step of preventing the rotation of the first bearing about a longitudinal axis of the first rail, wherein the first rail has a noncircular exterior profile.

13. The method of claim 8, wherein a thin layer of lubricant is disposed between the first bearing and the first rail so that the first bearing does not contact the first rail as the first bearing moves along the first rail in response to the input motion of the structure.

* * * * *